D. E. CARPENTER.
RECTIFIER SYSTEM.
APPLICATION FILED FEB. 5, 1914.
1,321,886.
Patented Nov. 18, 1919.
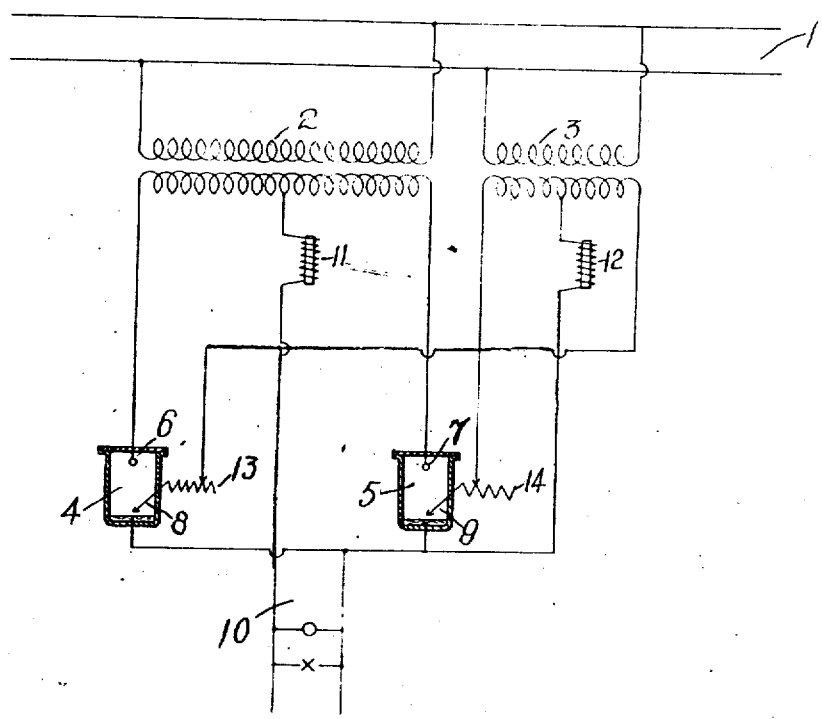
WITNESSES:
INVENTOR
David E. Carpenter
BY
ATTORNEY

UNITED STATES PATENT OFFICE.

DAVID E. CARPENTER, OF WILKINSBURG, PENNSYLVANIA, ASSIGNOR TO WESTINGHOUSE ELECTRIC AND MANUFACTURING COMPANY, A CORPORATION OF PENNSYLVANIA.

RECTIFIER SYSTEM.

1,321,886.  Specification of Letters Patent.  Patented Nov. 18, 1919.

Application filed February 5, 1914. Serial No. 816,713.

*To all whom it may concern:*

Be it known that I, DAVID E. CARPENTER, a citizen of the United States, and a resident of Wilkinsburg, in the county of Allegheny and State of Pennsylvania, have invented a new and useful Improvement in Rectifier Systems, of which the following is a specification.

My invention relates to systems for converting alternating currents into direct currents, and it has special reference to systems employing vapor rectifiers.

The object of my invention is to effect an arrangement of rectifier units in which short circuiting between the anodes within the rectifiers shall be avoided.

In brief, my invention comprehends the connection of the main anode and the keep-alive anode of each rectifier to a single source of alternating current in such manner that the alternate half-cycles are supplied to the main anode and the keep-alive anode, so that the main circuit and the keeping-alive circuit are active alternatively.

My invention is illustrated in the single figure of the accompanying drawing which is a diagrammatic view of the necessary apparatus and connections.

In the drawing, a source 1 of single-phase alternating current is shown as supplying current to two transformers 2 and 3. A vapor rectifier system comprising two rectifier units 4 and 5 receives current from the transformers 2 and 3. The unit 4 is provided with a main anode 6 and with an auxiliary anode 8 and, in like manner, the unit 5 is provided with a main anode 7 and with an auxiliary anode 9. The main anodes 6 and 7 are connected to the respective terminals of the secondary winding of the transformer 2, and the auxiliary anodes 8 and 9 are connected to the terminals of the secondary winding of the transformer 3. The connections to the auxiliary anodes, however, are reversed with respect to those of the main anodes, that is to say, assuming the right-hand terminals of the two secondary windings to be simultaneously positive, the right-hand terminal of the transformer 2 is connected to an anode in the unit 5, whereas the right-hand terminal of the secondary winding of the transformer 3 is connected to an anode in the unit 4. Thus, the current wave provided from the auxiliary anode in each rectifier unit has substantially 180° phase displacement from the main-current wave in the same unit and this current displacement permits the maintenance of both units. Both of the rectifiers deliver direct current to a single circuit 10. Reactances 11 and 12 are placed in circuit with the rectifiers in the usual manner, and variable resistances 13 and 14 are provided in series with the keep-alive anodes 8 and 9, respectively.

Since both of the transformers receive current from the same source of alternating current, it will be observed that the main anode and the keep-alive anode of each transformer will receive alternations which are constantly almost 180 degrees apart in phase, the two current waves in a given unit having not only this 180° phase relationship but each tending to persist throughout more than one-half cycle because of the reactance devices 11 and 12 in circuit, providing ample maintaining effect. The auxiliary maintaining circuit, comprising the transformer 3 and the auxiliary anodes 8 and 9, is provided in addition to the main circuit, as this auxiliary circuit may be very heavily loaded with reactance to provide a marked sustaining action without interposing this reactance in the path of the load current, with attendant serious lowering of the power factor. It results from this arrangement that the keeping-alive arc is entirely eliminated during the time that the main arc is active and it also results that the value of the keeping-alive current is very small at the beginning of its active half-cycle. The danger of short circuiting is consequently minimized.

The arrangement shown in the drawing is merely illustrative, and many changes might be made therein within the scope of my invention, as set forth in the appended claims.

I claim as my invention:

1. A rectifier system comprising a source of alternating current and a plurality of vapor rectifier units receiving current from said source, each rectifier unit having a main anode and an auxiliary anode, the current impulses supplied to the two anodes of each unit differing in phase by substantially 180°.

2. In a rectifying system, the combination with two converting units of the vapor type, each provided with a main anode, a main cathode and an auxiliary anode, of a main source of alternating current connected to said main anodes, respectively, an auxiliary source of alternating current substantially cophasial with respect to said main source, and connections from the cathodes of said units to intermediate points in said sources, the respective connections being reversed so that during periods of main-anode activity in either unit, the associated auxiliary anode is inactive and vice versa.

In testimony whereof I have hereunto subscribed my name this 31st day of Jan., 1914.

DAVID E. CARPENTER.

Witnesses:
 L. E. Frost,
 B. B. Hines.

Correction in Letters Patent No. 1,321,886.

It is hereby certified that in Letters Patent No. 1,321,886, granted November 18, 1919, upon the application of David E. Carpenter, of Wilkinsburg, Pennsylvania, for an improvement in "Rectifier Systems," an error appears in the printed specification requiring correction as follows: Page 1, line 106, claim 1, before the period insert the words *by virtue of reversed connections to said auxiliary anodes relative to the connections to the main anodes;* and that the said Letters Patent should be read with this correction therein that the same may conform to the record of the case in the Patent Office.

Signed and sealed this 30th day of December, A D., 1919.

[SEAL.]
M. H. COULSTON,
*Acting Commissioner of Patents.*

Cl. 175—363.